(12) United States Patent
Hindman (10) Patent No.: US 10,584,969 B2
(45) Date of Patent: *Mar. 10, 2020

(54) APPARATUS AND METHOD FOR SPACECRAFT CELESTIAL NAVIGATION USING EXTRASOLAR PLANETARY SYSTEM OBSERVATIONS

(71) Applicant: George William Hindman, Austin, TX (US)

(72) Inventor: George William Hindman, Austin, TX (US)

(73) Assignee: Keystone Aerospace, Pflugerville, TX (US)

( * ) Notice: Subject to any disclaimer, the term of this patent is extended or adjusted under 35 U.S.C. 154(b) by 150 days.

This patent is subject to a terminal disclaimer.

(21) Appl. No.: 15/488,850

(22) Filed: Apr. 17, 2017

(65) Prior Publication Data

US 2017/0219350 A1  Aug. 3, 2017

Related U.S. Application Data

(63) Continuation of application No. 14/624,232, filed on Feb. 17, 2015, now Pat. No. 9,658,073, which is a
(Continued)

(51) Int. Cl.
| | |
|---|---|
| *G01C 21/02* | (2006.01) |
| *G01J 3/02* | (2006.01) |
| *B64G 1/36* | (2006.01) |
| *G01C 21/24* | (2006.01) |
| *G01C 21/00* | (2006.01) |
| *B64G 1/10* | (2006.01) |

(52) U.S. Cl.
CPC ............ *G01C 21/025* (2013.01); *B64G 1/36* (2013.01); *B64G 1/361* (2013.01); *G01C 21/24* (2013.01); *G01J 3/0205* (2013.01); *G01J 3/0264* (2013.01); *B64G 2001/1064* (2013.01)

(58) Field of Classification Search
CPC ..... G01C 21/025; G01C 21/24; G01J 3/0205; G01J 3/0264; B64G 1/361; B64G 1/36; B64G 2001/1064; G01S 3/7867
See application file for complete search history.

(56) References Cited

U.S. PATENT DOCUMENTS 4,621,329 A * 11/1986 Jacob ................... G01C 21/025
356/139.01
5,109,346 A * 4/1992 Wertz ....................... B64G 1/36
364/459

(Continued)

*Primary Examiner* — Bernarr E Gregory
(74) *Attorney, Agent, or Firm* — Lila B. Glaser (57) ABSTRACT

The present invention provides an innovative apparatus and method for onboard spacecraft location determination and celestial navigation by employing observations of extrasolar planetary star systems. In one apparatus embodiment a gas absorption cell is placed between a sensor and the light from a reference star system with at least one exoplanet, such that the sensor can detect the spectrum through the gas absorption cell. Radial velocities can be calculated via Doppler Spectroscopy techniques and incorporated into a spacecraft navigation solution. The present invention can enable and enhance significant mission capabilities for future manned and unmanned space vehicles and missions.

12 Claims, 4 Drawing Sheets

Related U.S. Application Data continuation of application No. 13/538,655, filed on Jun. 29, 2012, now abandoned.

(60) Provisional application No. 61/571,554, filed on Jun. 30, 2011.

(56) References Cited

U.S. PATENT DOCUMENTS

| | | | | |
|---|---|---|---|---|
| 5,935,195 | A * | 8/1999 | Quine | B64G 1/361 356/139.01 |
| 6,236,939 | B1 * | 5/2001 | Wu et al. | B64G 1/361 701/222 |
| 6,272,432 | B1 * | 8/2001 | Li et al. | B64G 1/361 701/222 |
| 6,324,475 | B1 * | 11/2001 | Potteck | G01S 3/7867 244/3.18 |
| 6,622,970 | B2 * | 9/2003 | Guo | B64G 1/361 244/168 |
| 8,222,582 | B1 * | 7/2012 | Anderson | G01C 21/025 244/3.11 |
| 8,355,868 | B2 * | 1/2013 | Brace | G01C 21/025 342/357.57 |
| 8,825,399 | B2 * | 9/2014 | Vance | B64G 1/36 |
| 9,658,073 | B2 * | 5/2017 | Hindman | G01C 21/24 |

* cited by examiner

– PRIOR ART –

APPARATUS AND METHOD FOR SPACECRAFT CELESTIAL NAVIGATION USING EXTRASOLAR PLANETARY SYSTEM OBSERVATIONS

CROSS REFERENCE TO RELATED APPLICATIONS

This application is a continuation of and claims a benefit of priority under 35 U.S.C. § 120 of the filing date of U.S. patent application Ser. No. 14/624,232 filed on Feb. 17, 2015, now U.S. Pat. No. 9,658,073, which in turn claims the benefit of priority of U.S. patent application Ser. No. 13/538,655 filed on Jun. 29, 2012, now abandoned, which in turn claims the benefit of priority under 35 U.S.C. § 119 to U.S. Provisional Patent Application No. 61/571,554 filed Jun. 30, 2011, the entire contents of which are hereby expressly incorporated by reference for all purposes.

BACKGROUND OF THE INVENTION

1. Field of the Invention

The present invention is an innovative apparatus, system and method for spacecraft navigation employing the use of extrasolar planetary system motion. Spacecraft navigation can generally be described as, but not limited to, the determination of a spacecraft's position, velocity and attitude at certain times as well as the determination of orbital parameters and trajectories. Extrasolar planetary systems are star systems other than the Sun that have planetary companions. The present invention relates to several different fields including spacecraft hardware, software, navigation, astronomy, Doppler spectroscopy methods and astrometric techniques.

2. Description of the Related Art

Precise determination of spacecraft position and velocity is necessary in order to achieve mission success for operations of near Earth and interplanetary missions. Onboard flight technologies can provide spacecraft position, navigation and timing (PNT). Areas of related art include traditional spacecraft navigation hardware and software, tracking such as NASA's Deep Space Network (DSN), the Global Positioning System (GPS), X-ray navigation and extrasolar planetary detection.

Space navigation traditionally relies on initial spacecraft position, velocity and attitude estimates that are regularly updated by onboard inertial measurement unit (IMU) data. An IMU is a device that measures a spacecraft's velocity changes and orientation using a combination of accelerometers and gyroscopes. Spacecraft orientation can also be aided by a star tracker, which is an optical device that measures the relative position(s) of star(s) against the celestial background using photocells or a charged couple device (CCD) camera. Additional components such as horizon or sun sensors are also traditionally employed.

Methods of onboard orbit and position determination involve accurate updates to the spacecraft's navigation state matrix ("Nav State"). Periodic updates from external signals can be processed by onboard software algorithms and filters. As an example, in low Earth orbit (LEO), the Nav State can be refined by employing Kalman filtering and data from terrestrial navigation aids such as C band radar tracking or the GPS. There are various ways to implement these software filtering capabilities, one of which is NASA's GPS Enhanced Onboard Navigation Software (GEONS).

GEONS supports the acceptance of many one way forward Doppler, optical sensor observation and accelerometer data types. GEONS was designed for autonomous operation within the limited resources of an onboard computer. It employs an extended Kalman filter (EKF) augmented with physically representative models for gravity, atmospheric drag, solar radiation pressure, clock bias and drift to provide accurate state estimation and a realistic state error covariance. GEONS incorporates the information from all past measurements, carefully balanced with its knowledge of the physical models governing these measurements, to produce an optimal estimate of a spacecraft's orbit. GEONS' high-fidelity state dynamics model reduces sensitivity to measurement errors and provides high-accuracy velocity estimates, permitting accurate state prediction.

Interplanetary missions typically employ tracking services from NASA's DSN, which provides radiometric ranging, Doppler and plane-of-sky angle measurements. For spacecraft ranging, a signal is sent from one of the DSN stations on Earth to the spacecraft, which in turn sends a signal back to Earth. The round trip transit time is measured to determine the line of sight slant range. Two-way Doppler tracking also uses a signal sent to and from a spacecraft; by looking at the small changes in frequency, the spacecraft velocity along the line of sight can be determined.

In general, angular measurements can be made using multiple DSN ground stations that receive spacecraft transmissions simultaneously during overlapping viewing periods. An additional method used by DSN is delta differential one-way range (ADOR). This is a Very Large Baseline Interferometry (VLBI) technique that uses two ground stations to simultaneously view a spacecraft and then a known radio source (such as a quasar) to provide an angular position determination.

Unfortunately, DSN resources are limited and its accuracies degrade over large distances. Onboard spacecraft navigation systems that can reduce tracking requirements for the DSN are currently needed. Furthermore, GPS satellites orbiting the Earth are of limited use for deep space missions. Thus, hardware and software systems and methods that provide precise navigation solutions using a methodology that is independent of Earth based systems are not only innovative and novel but are currently needed for spacecraft navigation.

Some recent research and development with autonomous deep space navigation has examined the use of pulsed X-ray radiation emitted by pulsars. Such investigations designate X-ray millisecond pulsars as a potential signal source to be observed by a spacecraft. However, the specific characteristics of pulsars are limiting and very different from main sequence stars such as our sun. The current invention uses the properties of main sequence stars and their associated extrasolar planets.

In the past 15 years or so, over 700 extrasolar planets (or exoplanets) have been discovered orbiting around 560 main sequence stars (some stars have multiple detected exoplanets). These stars are evenly distributed throughout the celestial sphere and most are within several hundred light years (ly) of Earth. Some potential exoplanet reference stars include, but are not limited to, Epsilon Eridani (10 ly away), Gliese 86 (36 ly), 47 Ursae Majoris (43 ly), 55 Cancri (44 ly), Upsilon Andromedae (44 ly), 51 Pegasi (48 ly) and Tau Bootis (49 ly). All have well known characteristics and are even visible to the naked eye.

Before the discovery of exoplanets, the only planets known to exist were those in our own solar system. The motion of the Earth about our Sun is well understood and the whole solar system in fact rotates around a common center of mass, known as the barycenter. Astronomers, in order to detect possible planets around stars other than our Sun, had to separate known and unknown stellar motion to determine the motion of other stars about their own barycenters. The initial theory postulated that if exoplanets did exist, their orbits would cause their parent star to wobble by a small amount. This motion was indeed detected, yielding numerous exoplanet discoveries. The measurements to date have produced now well known patterns of highly stable, predictable exoplanetary system stellar motion with respect to our own solar barycenter. This exoplanetary system stellar motion can be used to determine the location of a spacecraft both within and outside of our solar system. This is the methodology employed by the present invention.

SUMMARY OF THE INVENTION

The present invention is an apparatus, system and method for spacecraft location determination and navigation employing extrasolar planetary system motion. The apparatus, system and method provide onboard orbit or location determination and navigation capabilities during spacecraft operations through the use of specialized reference stars that have exoplanet companions. The motion of these exoplanets around the reference star's barycenter provides a stable, highly predictable natural signal pattern. The measurements of these signal patterns are taken onboard the spacecraft and are used with onboard software algorithm estimation techniques to determine both spacecraft location and navigation. The present invention enables and enhances significant mission capabilities for future manned and unmanned space vehicles as well as reducing DSN tracking requirements and resources.

The present invention can provide primary or secondary navigation capabilities for space missions. It is expected to provide positional solutions anywhere within the solar system as well as beyond our solar system. Primary autonomous navigation can be incorporated into spacecraft designed for geostationary, elliptical high earth orbits, or deep space orbits or trajectories. Back-up or secondary navigation capabilities could be available for emergency situations in low and medium Earth orbits when primary navigation is lost (such as in the case of denied access to GPS). The present invention could be used for manned missions and would be particularly useful at locations currently of interest such as lunar orbits, asteroids, comets, libration points, Martian moons or outer solar system planets.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Nav State determination through the use of extrasolar planetary system motion data is an innovative method for onboard spacecraft navigation. It will significantly enable and enhance mission capabilities for future manned and unmanned space vehicles as well as reducing the need for Deep Space Navigation resources. Over 700 extrasolar planets have been discovered around nearby main sequence stars within the past 15 years. The motion of these extrasolar planets around their stellar barycenters provides a stable, highly predictable natural signal pattern. Observations from these star systems allow for enhanced spacecraft self determination of orbits and position as well as navigation.

Extrasolar Planetary System Motion and Measurements

Earth based exoplanet searches have sought to identify planetary systems by observing characteristics of the parent star about which the potential planet is orbiting. The main methodologies employed for such exoplanet detection have been astrometry and Doppler spectroscopy. In celestial mechanics, the simplest case is of a single planet orbiting around one star. The system orbital parameters can be derived from Equation 1:

$$a^3 = (M_* + m_p)P^2 \quad (1)$$

where the masses ($M_*$, $m_p$) are in solar units, the semi-major axis (a) is in astronomical units (AU) and the period (P) is in years. The motion of the star is much smaller than that of the associated planet. Using techniques for indirect observation of exoplanets, the small motion of the reference star is detected, allowing for calculations that infer the existence of the exoplanet.

Figure 1:
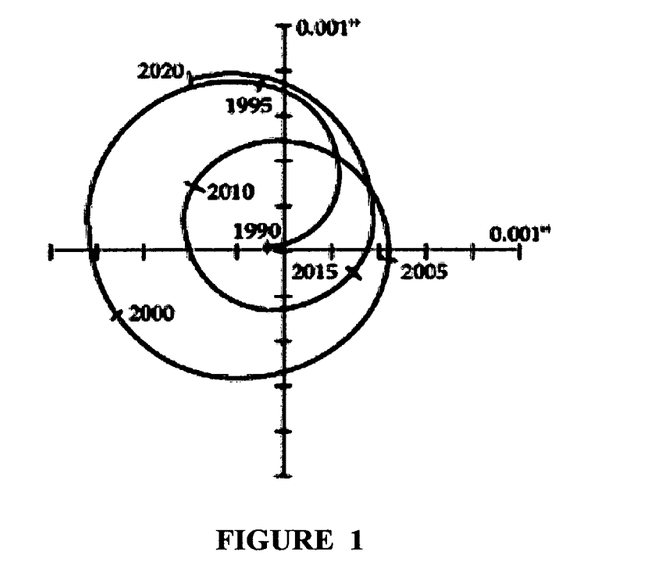
FIG. 1 illustrates Solar motion about the barycenter, from the time period of 1960 to 2025 AD.

Astrometry attempts to measure the movement of a star with respect to background stars. In cases where the movement is apparent, parallax is being measured. If a star were seen to have an elliptical motion, the probable explanation would be that the wobble is due to a star orbiting about its barycenter. Using Equation 1 and the fact that the semi-major axis can be measured as an angle, θ, yields Equation 2:

$$\theta = \frac{m_p}{M_*}\frac{a}{r} = \frac{m_p}{r}\left(\frac{P}{M_*}\right)^{2/3} \quad (2)$$

where θ is in arcsec when a is in AU, both masses are in solar units, distance (r) is in parsecs (pc) and P is in years. For example, if one were to view our solar system from a distance of 10 pc, Jupiter would appear as an 11.9 year disturbance in the Sun's motion with a 0.5 milliarcsec amplitude. FIG. 1 displays what our solar system motion about its barycenter would look like if viewed from the north ecliptic pole at a distance of 10 pc, with the right horizontal axis pointing to the Vernal Equinox. Planet detection is most sensitive to stars that are near the solar neighborhood and have a large planet. Most of the exoplanets detected to date have been described as "large Jupiters", with periods measured in days.

Figure 2:
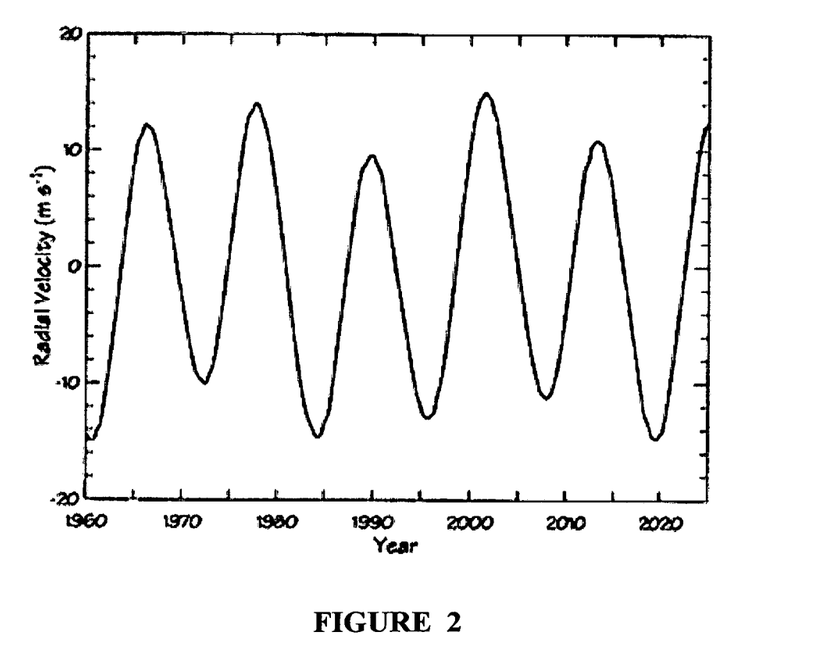
FIG. 2 illustrates the radial velocity of the Sun as it orbits the solar system barycenter.

For astrometry, the motion of the star is most pronounced when the exoplanet(s) orbiting the star are in a plane perpendicular to the line of sight of the observation point. Any other orientation would produce some cyclical motion towards and then away from the observation point. Doppler spectroscopy takes advantage of this radial motion by trying to detect the alternating red and blue spectrum shifts that a star in this orientation would have. This Doppler motion would create a variable radial velocity as dictated by Equation 3:

$$v = 30 \frac{m_p \sin i}{(aM_*)^{1/2}} = 30 \frac{m_p \sin i}{M_*^{2/3} P^{1/3}} \quad (3)$$

where v is in km/sec, the masses are in solar units, a is in AU, P is in years and i is the inclination of the orbit to the plane of the sky. Using the previous example for astrometry, Jupiter has a velocity variation of 13.0 m/sec over a period of 11.9 years. Most exoplanets detected to date have larger velocity variations than Jupiter, over a period of just days. FIG. 2 depicts the apparent radial velocity shift of our Sun, primarily due to Jupiter, as viewed from the Vernal Equinox for the same time period as shown in FIG. 1.

Doppler spectroscopy measurements are thus exceptionally useful, since identified stars with planetary companions have a stable, known repeatable pattern of motion. Astrometric measurements of parallax and stellar angular displacements also provide valuable data. Since these stellar motions about the barycenter are known with a high degree of precision and consistently and reliably repeat over many cycles and years, they make excellent reference sources. Currently there are over 500 observed exoplanet star systems. This population allows for a viable extrasolar planetary system reference database for onboard spacecraft navigation.

Full three dimensional absolute and relative navigation solutions are achievable from extrasolar planetary system sources, including position and velocity determination as well as spacecraft attitude determination. Spacecraft navigation algorithms and software filtering can combine onboard measurements with exoplanetary stellar motion based models and other characteristics, such as source declination, right ascension and proper motion to yield a solution. Absolute position or delta updates to a position can be calculated and blended with a spacecraft's Nav State.

Absolute positions may be obtained either by range or wavelength phase measurements. In general, a spacecraft range ($\rho$) can be calculated from the difference in the transmit and receive times of one source spectrum by Equation 4:

$$\rho = c(t_r - t_t) \quad (4)$$

where c is the speed of light. If the range measurement is known as well as the unit vector for the extrasolar planetary system source, the spacecraft range in an inertial reference system may be computed. Absolute position can also be achieved through simultaneous observations of several sources. Determining the range measurements of any unique set of three extrasolar planetary systems yields the location of a spacecraft in three dimensional space.

Wavelength phase measurements can be thought of as a total wavelength phase that is the sum of some integer number of cycles plus a fraction of one cycle. These measurements and their time of arrival can be merged and used by navigation software to determine position by employing a process similar to GPS integer cycle ambiguity resolution. The basic equation for GPS carrier phase pseudorange is well known in the literature and can be written as Equation 5:

$$\Phi = [1/\lambda]\rho + f\Delta\delta + N \quad (5)$$

where $\Phi$ is the measured carrier phase, N is the phase ambiguity integer or "integer ambiguity", $\Delta\delta$ is the clock bias, $\lambda$ and f are the GPS carrier phase wavelength and frequency, and $\rho$ is the range. Substituting $f=c/\lambda$ and expressing Equation 5 as a mathematical model yields Equation 6 and Equation 7:

$$\Phi_{ij}(t) = [1/\lambda]\rho_{ij}(t) + [c/\lambda]\Delta\delta_{ij}(t) + N_{ij} \quad (6)$$

where i and j are two points in a designated reference frame at an epoch (t) and:

$$\rho_{ij}(t) = [(X_j(t) - X_i)^2 + (Y_j(t) - Y_i)^2 + (Z_j(t) - Z_i)^2]^{1/2} \quad (7)$$

While the above equations are usually applied to GPS and its geocentric reference frame, the same concepts are employed for the space environment for the purposes of this invention. The wavelength selected could be any one of many that are associated with the stellar signature of an extrasolar planetary system and the coordinates can be in an inertial solar reference frame tied to the solar barycenter. Using this type of solar reference frame and an appropriate timing model defined at a specific location, information observed at a spacecraft can be matched with data in an onboard extrasolar planetary system database to provide a navigation solution.

Furthermore, onboard software algorithms may employ differencing techniques for one or more extrasolar planetary systems to remove errors. A single difference calculation could be done between the measured spacecraft wavelength phase arrival and the phase predicted at a model location. A double difference could be obtained by subtracting two single differences from two different sources. A triple difference could be calculated by subtracting two double differences from two separate time epochs.

It is also noted that the observed star radiates in the entire electromagnetic spectrum, so multiple wavelengths can be monitored at the same time. This would provide for naturally occurring multiple frequencies from the source, similar to GPS satellites broadcasting more than just one L band frequency.

Exoplanetary System Star Tracker Apparatus for Space Navigation

Figure 3:
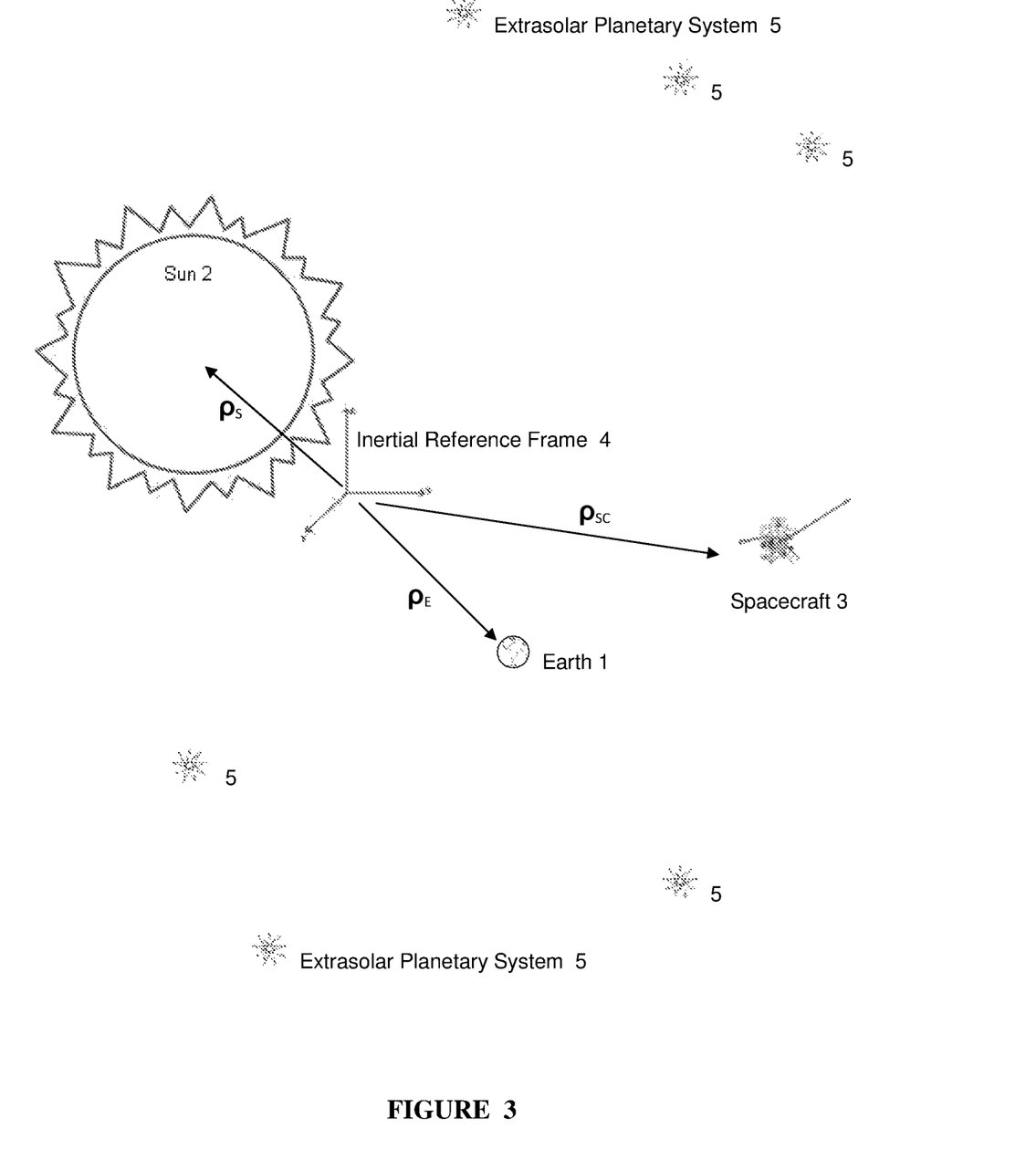
FIG. 3 illustrates a spacecraft in the space environment.

FIG. 3 depicts a partial representation of the space environment, with the Earth 1 orbiting the Sun 2. A spacecraft 3 is also depicted, with the disclosed inventions located onboard. An inertial solar reference frame 4 is shown with the origin located at the solar system barycenter. The distances to the Earth, Sun and spacecraft in the reference frame are indicated by $\rho_E$ $\rho_S$ and $\rho_{SC}$ respectively. Some extrasolar planetary systems 5 are viewable from the spacecraft. Each independent extrasolar planetary system 5 would have a known unit vector in the inertial reference frame as well as a known stellar signature.

Figure 4:
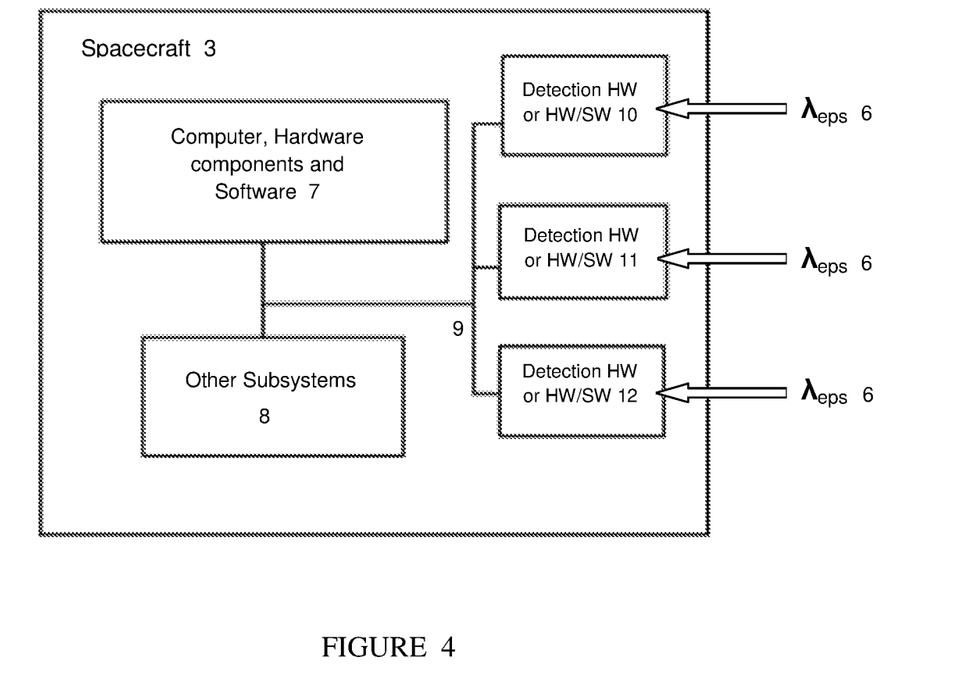
FIG. 4 illustrates a functional spacecraft block diagram.

FIG. 4 depicts a spacecraft functional block diagram of one embodiment of the invention. A spectrum wavelength $\lambda_{eps}$ from one or more extrasolar planetary system sources 6 is viewable from the spacecraft 3. The spacecraft has an onboard computer 7 with hardware components such as, but not limited to, processor(s), memory, storage, busses, power sources, oscillators and/or timing sources. The onboard computer 7 also has software processing capabilities and algorithms that perform various navigation functions such as, but not limited to, signal processing, clock adjustments, ephemeris and model propagation and filtering corrections (such as least squares or Kalman) to improve position and velocity estimates.

The spacecraft 3 also has other subsystems 8. Subsystems 8 may include, but are not limited to, navigation units such as IMUs, star trackers, GPS receivers, horizon and sun sensors. Subsystems 8 may also include, but are not limited to, scientific instruments, guidance units, thrusters, propulsion engines and communication systems. A data bus system 9 connects the onboard computer 7 to the spacecraft subsystems 8 as well as to one or more extrasolar planetary system star trackers, depicted as 10, 11 and 12 in FIG. 4. If more than one extrasolar planetary system star tracker is located on a spacecraft, the orientation of their axes and fields of view may be chosen to optimize a function such as, but not limited to, viewing different sources or redundancy. An extrasolar planetary system star tracker or sensor may be comprised of various components such as, but not limited to, photocells, CCDs, gas absorption cells, processor(s), memory, storage, busses, power sources and oscillators.

Figure 5:
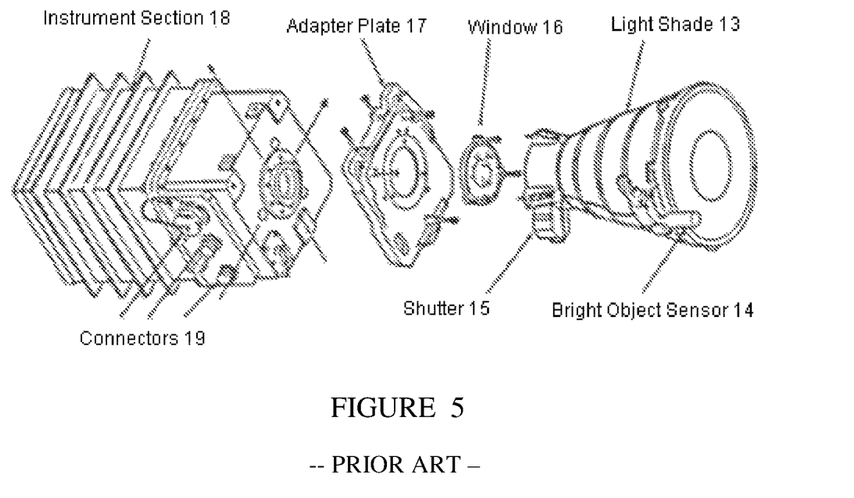
FIG. 5 illustrates the components of a standard star tracker.

The present invention incorporates advancements to traditional star trackers that have been used in the aerospace industry. These star trackers have been integrated into spacecraft platforms and most applications to date have used them for corrections to IMU or ring laser gyro derived spacecraft attitudes. Individual star trackers have also been used during the approach phase of rendezvous operations to update a spacecraft's relative Nav State. FIG. 5 depicts a typical star tracker. Major components usually include a light shade 13, a bright object sensor 14, a shutter mechanism 15, a protective window 16, an adapter plate 17, and a main assembly instrument section 18 with connectors 19.

The present extrasolar planetary system star tracker invention could still be employed for traditional uses. However, the greatest benefits are derived from the innovative approaches implemented in the instrument package, namely orbit and location determination and navigation capabilities through utilization of Doppler spectroscopy and/or astrometry. Doppler spectroscopy is achieved by placing a gas absorption cell or other similar device in the star tracker field of view. Another embodiment would allow potential astrometric data to be obtained with a photon collector or a Michelson interferometer. A navigation solution is determined or refined by the radial velocities produced by Doppler spectroscopy of a reference star with exoplanets and/or astrometric angular displacements and parallax measurements.

An embodiment of the present invention may use single aperture and/or interferometric equipment for astrometric measurements. Radial velocity detection for Doppler spectroscopy may use the Fabry-Perot and/or gas absorption cell techniques. The preferred embodiment of the present invention star tracker system would make use of an $I_2$ gas absorption cell. The $I_2$ gas absorption cell technique has been successful in the Earth based detection of exoplanets. The main components consist of a translucent glass cell, heaters, temperature sensors, insulation and necessary electronics.

Figure 6:
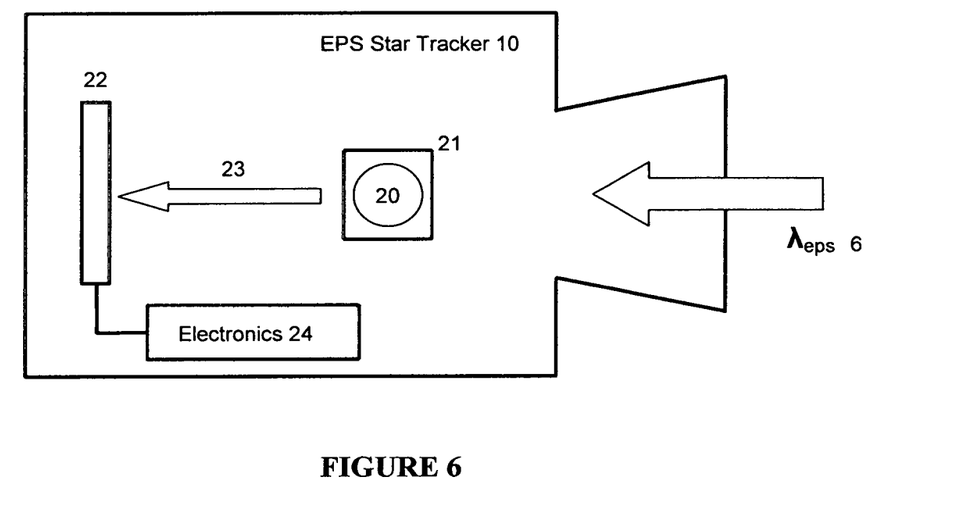
FIG. 6 illustrates an exoplanetary star tracker apparatus and gas absorption cell block diagram.

FIG. 6 depicts a block diagram preferred embodiment of an extrasolar planetary system star tracker with a gas absorption cell apparatus. Iodine gas is enclosed in a central tube 20 and the whole cell housing 21 is placed in the path of the stellar spectrum 6 being observed. The spectrometer CCD 22 records the photons detected in the designated wavelengths for both the stellar spectrum 6 and the $I_2$ gas cell spectrum 23. The electronic package 24 may be comprised of various components such as, but not limited to, processor(s), memory, storage, busses, power sources, oscillators as well as software algorithms and programs. The pure stellar spectrum template is eventually compared to the combined $I_2$ gas cell and stellar spectrum to derive the necessary radial velocities With the present invention, data could also be collected from a potential astrometric interferometer. Most existing star trackers are set up to detect some minimum light flux intensity and then record the location of the light in the star tracker's field of view. Interferometers obtain data in another manner. The present invention apparatus may have various embodiments with an interferometer, either within the extrasolar planetary system star tracker apparatus itself, several devices located on the spacecraft platform or devices located on multiple spacecraft.

Figure 7:
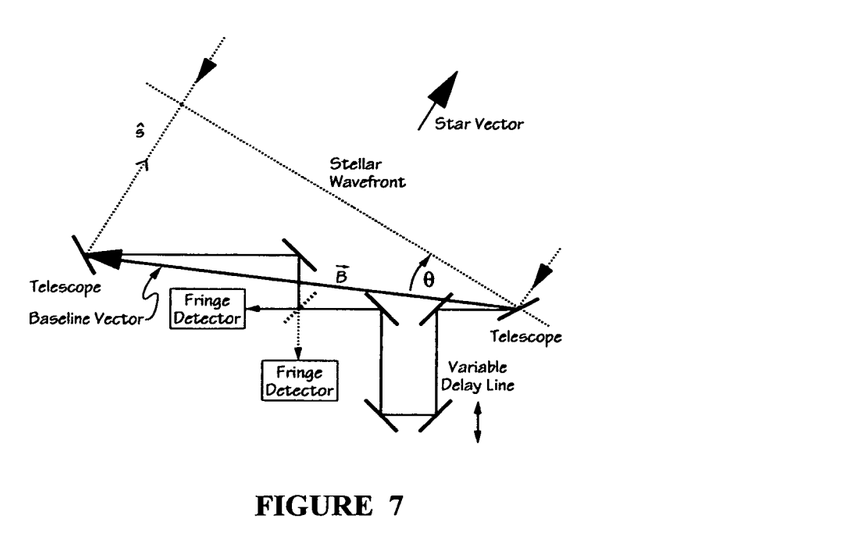
FIG. 7 illustrates the principle elements of an astrometric interferometer.

Referring to FIG. 7, light from the target star is collected by two subapertures and routed via mirrors to a beam splitter (a partially reflective mirror) where the two beams are combined. This combined beam will exhibit constructive and destructive interference; the interference will be at a maximum if there are equal optical path lengths from the source to the beam splitter via the two arms. If the source direction is shifted relative to the interferometer baseline, an additional path delay results in one beam external to the interferometer. This path delay must be compensated by an equal amount of path delay in the other beam internal to the interferometer to maintain the maximum interference. This relationship can be written as Equation 8:

$$X = B \cdot S + C = |B| \sin \theta + C \qquad (8)$$

where B is the baseline vector (essentially the vector connecting the two subapertures), S is the unit vector to the star, C is a constant (instrument bias) and the delay X is the amount of internal path length necessary to equalize the path delays. Thus, the delay X is a measure of the angle between the interferometer baseline and the star unit vector.

The present invention apparatuses, systems and methods disclosed in this application are envisioned to have multiple forms, steps and embodiments. These can include, but are not limited to, various modifications, separate and/or integrated components, chipsets, boards, sensors and computer architectures as well as similar or analogous hardware and software.

The invention claimed is:

1. An extrasolar planetary star tracker apparatus for a spacecraft which allows the observation of an extrasolar planetary star system with at least one exoplanet comprising:
    a spectrum differentiation apparatus placed in a housing configured to receive the spectrum from the extrasolar planetary star system with at least one exoplanet;
    a charge coupled device to observe the extrasolar planetary star system spectrum; and
    a data bus connecting the charge coupled device to an electronics assembly, wherein the electronics assembly is comprised of a processor and memory used to compare the spectrum observed by the charge coupled device to an onboard extrasolar planetary star system reference database to derive an onboard spacecraft navigation solution.

2. The apparatus of claim 1, wherein the spectrum observed by the charge coupled device is used to calculate radial velocities using Doppler spectroscopy.

3. The apparatus of claim 1, wherein the spectrum observed by the charge coupled device is used to calculate spacecraft velocity.

4. The apparatus of claim 1, wherein the charge coupled device observed spectrum measurements are used to calculate a filtered estimate of spacecraft position.

5. The apparatus of claim 1, wherein the extrasolar planetary star system with at least one exoplanet is used to calculate spacecraft attitude.

6. The apparatus of claim 1, wherein an additional data bus is connected to the electronics assembly to disseminate observed measurements to spacecraft systems.

7. The apparatus of claim 6, wherein a computer located onboard the spacecraft calculates spacecraft position with additional navigation sensor measurements.

8. A spacecraft celestial navigation system utilizing the observations of extrasolar planetary star systems to interferometrically derive spacecraft navigation solutions comprising:
   two or more extrasolar planetary star trackers, each containing a housing for a gas absorption cell placed in the path of the extrasolar planetary star system spectrum being observed and a spectrometer used to detect the extrasolar planetary star system spectrum from the gas absorption cell; and
   a data bus connecting the two or more extrasolar planetary star trackers to a computer located onboard the spacecraft; wherein the computer located onboard the spacecraft uses the baseline distance between the extrasolar planetary star trackers and the spectra detected by the two or more spectrometers to compare to an onboard extrasolar planetary star system reference database to interferometrically derive a spacecraft navigation solution.

9. The system of claim 8, wherein the computer located onboard the spacecraft calculates spacecraft position using a Kalman filter.

10. The system of claim 8, wherein the computer located onboard the spacecraft calculates spacecraft position with additional spacecraft sensor measurements.

11. The system of claim 8, wherein the computer located onboard the spacecraft is used for controlling the velocity of the spacecraft.

12. The system of claim 8, wherein the extrasolar planetary star trackers are used for calculating spacecraft attitude.

* * * * *